(12) United States Patent
Yamada

(10) Patent No.: US 11,003,401 B2
(45) Date of Patent: May 11, 2021

(54) NON-TRANSITORY COMPUTER-READABLE RECORDING MEDIUM STORING COMPUTER-EXECUTABLE INSTRUCTIONS FOR INFORMATION PROCESSING DEVICE, AND METHOD OF CONTROLLING INFORMATION PROCESSING DEVICE

(71) Applicant: BROTHER KOGYO KABUSHIKI KAISHA, Nagoya (JP)

(72) Inventor: Jun Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/367,415

(22) Filed: Mar. 28, 2019

(65) Prior Publication Data
US 2019/0303068 A1  Oct. 3, 2019

(30) Foreign Application Priority Data
Mar. 29, 2018  (JP) .............................. JP2018-065266

(51) Int. Cl.
*G06F 3/12*  (2006.01)

(52) U.S. Cl.
CPC ............ *G06F 3/1228* (2013.01); *G06F 3/121* (2013.01); *G06F 3/1203* (2013.01); *G06F 3/1232* (2013.01)

(58) Field of Classification Search
CPC ...... G06F 3/1228; G06F 3/1203; G06F 3/121; G06F 3/1232; G06F 3/1247; G06F 3/1206; G06F 3/1226; G06F 3/1288
See application file for complete search history.

(56) References Cited

U.S. PATENT DOCUMENTS

| | | | |
|---|---|---|---|
| 2004/0130744 A1 | 7/2004 | Wu et al. | |
| 2004/0130746 A1* | 7/2004 | Wu | G06F 3/1222 358/1.15 |
| 2006/0074840 A1 | 4/2006 | Gava et al. | |
| 2008/0306902 A1 | 12/2008 | Gava et al. | |
| 2009/0064198 A1* | 3/2009 | Kobayashi | H04N 1/00278 719/327 |
| 2012/0050799 A1 | 3/2012 | Towata | |
| 2013/0301080 A1* | 11/2013 | Nakata | G06F 3/1204 358/1.15 |

FOREIGN PATENT DOCUMENTS

| | | |
|---|---|---|
| JP | 2004-213656 A | 7/2004 |
| JP | 2009-076068 A | 4/2009 |
| JP | 2012-048457 A | 3/2012 |

\* cited by examiner

*Primary Examiner* — Iriana Cruz
(74) *Attorney, Agent, or Firm* — Scully, Scott, Murphy & Presser, PC

(57) ABSTRACT

An information processing device is configured to execute a management program and a print server program. The management program determines whether a non-compliant printer is connected to the information processing device, determines whether a print server program is running when the non-compliant printer is connected, starts up the print server program when the print server program is not running, and registers a print server configured by the print server program with an operating system. The print server program receives a print job designating the print server as an output destination, obtains individual print data which is printable by the non-compliant printer, and transmits the obtained individual print data to the non-compliant printer.

11 Claims, 9 Drawing Sheets

NON-TRANSITORY COMPUTER-READABLE RECORDING MEDIUM STORING COMPUTER-EXECUTABLE INSTRUCTIONS FOR INFORMATION PROCESSING DEVICE, AND METHOD OF CONTROLLING INFORMATION PROCESSING DEVICE

CROSS-REFERENCE TO RELATED APPLICATION

This application claims priority under 35 U.S.C. § 119 from Japanese Patent Application No. 2018-065266 filed on Mar. 29, 2018. The entire subject matter of the application is incorporated herein by reference.

BACKGROUND

Technical Field

The present disclosures relate to a non-transitory computer-readable recording medium storing computer-executable instructions for information processing device, and method of controlling information processing device.

Related Art

Conventionally, a driverless printing technique has become widely used. The driverless printing technique is for performing printing with use of a printing function of an OS (operating system) without installing a printer driver in a device (e.g., an information processing device) which transmits print data to a printer.

SUMMARY

It is noted, however, if a printer (e.g., a low end printer) are not compliance with the driverless printing technique, the printer cannot perform printing unless a printer driver is installed in the OS. In order to perform printing when the printer is not compliance with the driverless printing technique and the printer driver is not installed in the information processing device, there is known a technique in which the printer transmits the printer driver to the information processing device and the information processing device executes installing of the printer driver therein so that the information processing device functions as a printer server.

Even if the technique which operates an information processing device as a printer driver is used, when an OS environment of the information processing device does not allow installation of the printer driver, the printer, which is not compliance with the driverless printing technique (e.g., AirPrint®), cannot be selected with use of the printing function of the OS of the information processing device, and printing cannot be performed.

According to aspects of the present disclosure, there is provided a non-transitory computer-readable recording medium containing computer-executable instructions to be executed by a controller of an information processing device. The instructions including first instructions constituting a management program and second instructions constituting a print server program. The first instructions cause, when executed by the controller, the information processing device to perform a first connection determining process of determining whether a particular printer is connected through a communication interface of the information processing device, when it is determined in the first connection determining process that the particular printer is connected, a running determination process of determining whether the print server program constituted by the second instructions corresponding to the particular printer is running, when it is determined in the running determination process that the print server program constituted by the second instructions is not running, a startup process of starting up the print server program constituted by the second instructions, and when the print server program constituted by the second instructions is started up in the startup process, a print server registration process of registering a print server configured by the print server program as started up with an operating system of the information processing device as a printer. The second instructions cause, when executed by the controller, the information processing device to perform a receiving process of receiving, through the operating system, a print job designating the registered print server as an output destination, when the print job is received in the receiving process, print data obtaining process of obtaining print data having a particular format printable by the particular printer based on the print job, and a transmitting process of transmitting the print data obtained in the print data obtaining process to the particular printer.

According to aspects of the present disclosure, there is provided a method of controlling an information processing device. The method including determining whether a particular printer is connected through a communication interface of the information processing device, when it is determined that the particular printer is connected, determining whether a print server program corresponding to the particular printer is running, when it is determined that the print server program is not running, starting up the print server program, when the print server program is started up, registering a print server configured by the print server program as started up with an operating system of the information processing device as a printer, receiving, through the operating system, a print job designating the registered print server as an output destination, when the print job is received, obtaining print data having a particular format printable by the particular printer based on the print job, and transmitting the obtained print data to the particular printer.

BRIEF DESCRIPTION OF THE ACCOMPANYING DRAWINGS

DETAILS DESCRIPTION OF ILLUSTRATIVE EMBODIMENT

Hereinafter, referring to the accompanying drawings, an application program (hereinafter, referred to as "APP")

according to an illustrative embodiment of the present disclosures will be described. The APP described hereinafter enables an information processing device to cause the printer to perform printing.

Figure 1:
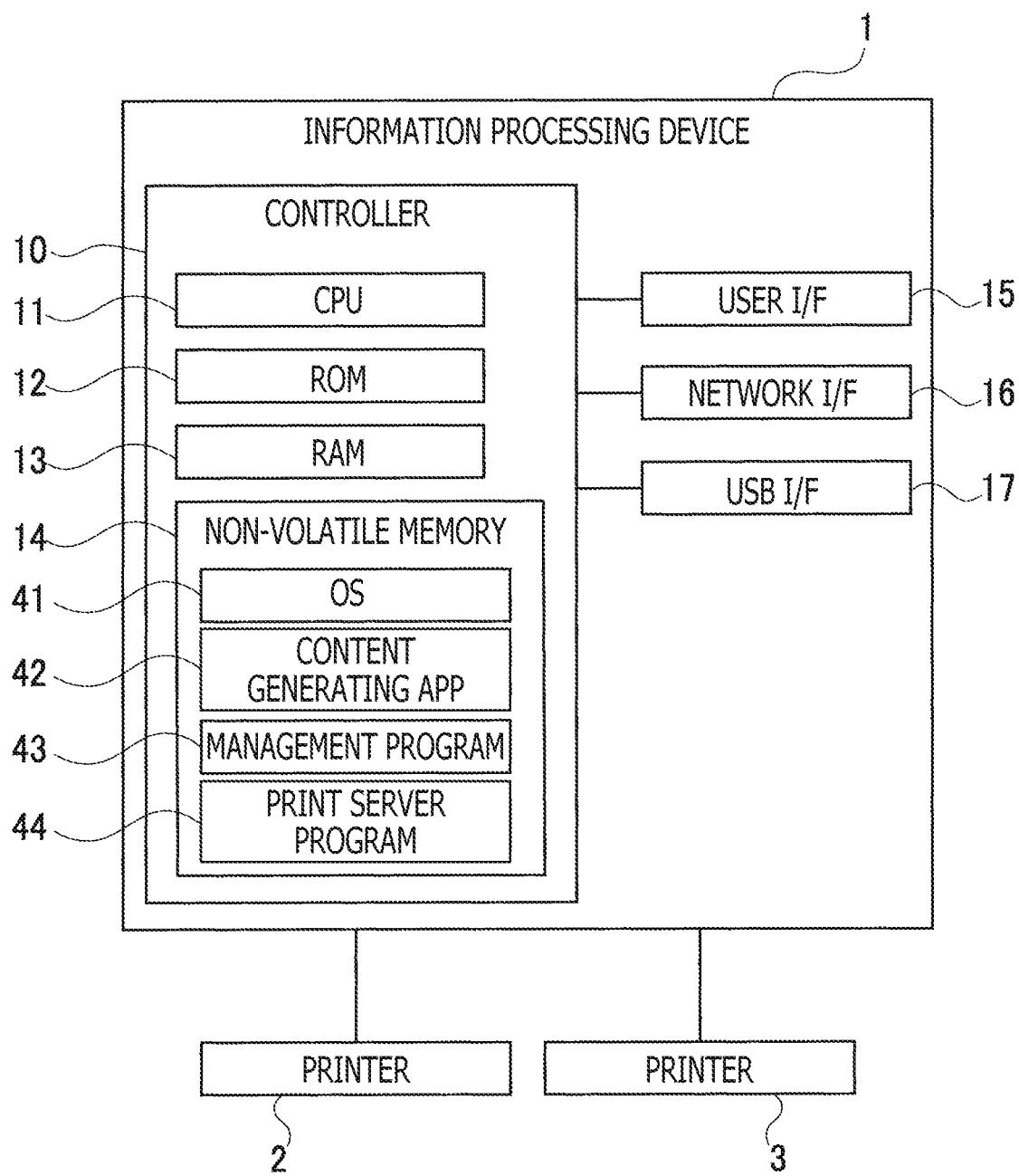
FIG. 1 is a block diagram schematically showing a configuration of an information processing device according to an illustrative embodiment of the present disclosures to which printers are connected.

The APP is executed by the information processing device 1 to which printers 2 and 3 are connected (FIG. 1). The information processing device 1 is, for example, a personal computer, a smartphone, a tablet computer or the like, which is configured to generate and edit image data, transmit a print execution command to respective printers 2 and 3, and the like.

The information processing device 1 is provided with, as shown in FIG. 1, a controller 10 including a CPU 11, a ROM 12, a RAM 13, a non-volatile memory 14. The information processing device 1 is further provided with a user I/F 15, a network I/F 16, a USB I/F 17 which are electrically connected to the controller 10. The CPU 11 is an example of a controller. A buffer of the CPU 11, the ROM 12, the RAM 13, the non-volatile memory 14 are examples of a memory. Each of the network I/F 16 and the USB I/F 17 is an example of a communication interface.

The ROM 12 stores a startup program for starting up the information processing device 1. The RAM 13 is used as a work area when various processes are performed and/or a storage area for temporarily storing data. The non-volatile memory 14 is, for example, an HDD or a flash memory, which is used as an area for storing programs, various pieces of data (e.g., image data), and various settings.

The CPU 11 performs various processes in accordance with programs retrieved from the ROM 12 and non-volatile memory 14, or based on user operations. It is noted that the controller 10 is a collective name including hardware and software used to control the information processing device 1, and does not necessarily mean a single hardware existing in the information processing device 1.

The user I/F 15 is hardware which receives user operations and displays information. The user I/F 15 may be one having both an input function and an output function (e.g., a touch panel), or may be configured as a combination of a plurality of devices such as a display, a keyboard and a mouse.

The network I/F 16 includes hardware used to communicate with external devices through a network such as the Internet. A communication standard employed in the network I/F 16 is, for example, Ethernet®, Wi-Fi® or the like. The USB I/F 17 includes hardware performing communication compliant with a USB standard. It is noted that a communication method employed by the network I/F 16 and the USB I/F 17 may be a wireless communication or a wired communication.

The information processing device 1 according to the illustrative embodiment has a driverless printing function which is a function to perform printing without a printer driver being installed. The driverless printing function is a printing function of generating a print job including standardized print data which is general purpose print data independent of printer models, and transmitting the generated print job to the printer. Examples of the driverless printing function are AirPrint® and Mopria®.

As shown in FIG. 1, two printers 2 and 3 are connected to the information processing device 1. Each of the printers 2 and 3 can form an image on a printing medium. Examples of the printers 2 and 3 are a page printer, a copier, an MFP and a facsimile machine.

The printer 2 is connected to the information processing device 1 through the network I/F 16. The printer 2 is compliant with the driverless printing function of the information processing device 1. In the following description, the printer 2 will occasionally be referred to as a compliant printer 2. The compliant printer 2 has a program for generating image data for printing (hereinafter, referred to as printing image data) used by itself (i.e., the printer 2) based on the standardized print data of the print job transmitted from the information processing device 1. The compliant printer 2 generates the printing image data based on the received standardized print data, and performs printing with use of the generated printing image data.

The printer 3 is connected to the information processing device 1 through the network I/F 16 or the USB I/F 17. The printer 3 is not compliant with the driverless printing function of the information processing device 1. In the following description, the printer 3 will occasionally be referred to as a non-compliant printer 3. The non-compliant printer 3 does not have a function to generate the printing image data based on the standardized print data. Therefore, the non-compliant printer 3 cannot perform printing even if the standardized print data is received. When processible print data is received, the non-compliant printer 3 uses the received print data as the printing image data, or converts the received print data to the printing image data, and performs printing. Further, the non-compliant printer 3 does not respond to a printer detection signal in accordance with the driverless printing function. Therefore, the information processing device 1 performing the driverless printing function does not recognize the non-compliant printer 3 as a printing device. The non-compliant printer 3 is an example of a particular printer.

The information processing device 1 has a APP causing the non-compliant printer 3 to perform printing. As shown in FIG. 1, in the non-volatile memory 14 of the information processing device 1, various programs including an OS 41, a content generating APP 42, a management program 43 and a print server program 44 are stored. It is noted that a part of the OS 41 may be stored in the ROM 12.

The OS 41 of the information processing device 1 has the driverless printing function, and does not accept installation of a printer driver corresponding to an individual model of a printer. Therefore, in the non-volatile memory 14 of the information processing device 1, a printer driver program for the non-compliant printer 3 is not stored.

The content generating APP 42 is for generating a content subject to be printed (e.g., a text, an image, a chart and etc.). The content generating APP 42 has a function of receiving a print command based on a user operation. It is noted that the information processing device 1 may be provided with a plurality of content generating APP's 42.

The management program 43 and the print server program 44 are used when the non-compliant printer 3 connected to the information processing device 1 is used to perform printing based on the content generated by the content generating APP 42 or the like. The management program 43 and the print server program 44 are examples of an application program.

The management program 43 starts up the print server program 44 corresponding to the non-compliant printer 3, and registers a print server configured by the print server program 44 with the OS 41 as a virtual printer. By registering the print server with the OS 41 as the virtual printer, it becomes possible that the content generating APP 42 selects the virtual printer as an output destination. The print server program 44 is a program which converts the print job output by the driverless printing function of the OS 41 to a format which can be processed by the non-compliant printer 3, and transmits the converted print job to the non-compliant printer 3.

It is noted that a single management program 43 is provided per the single information processing device 1, while a single print server program 44 is provided per each non-compliant printer 3. When a plurality of non-compliant printers 3 are connected to the information processing device 1, the print servers are started up for respective non-compliant printers 3, and registered with the OS 41 as virtual printers respectively corresponding to the non-compliant printers 3.

Figure 2:
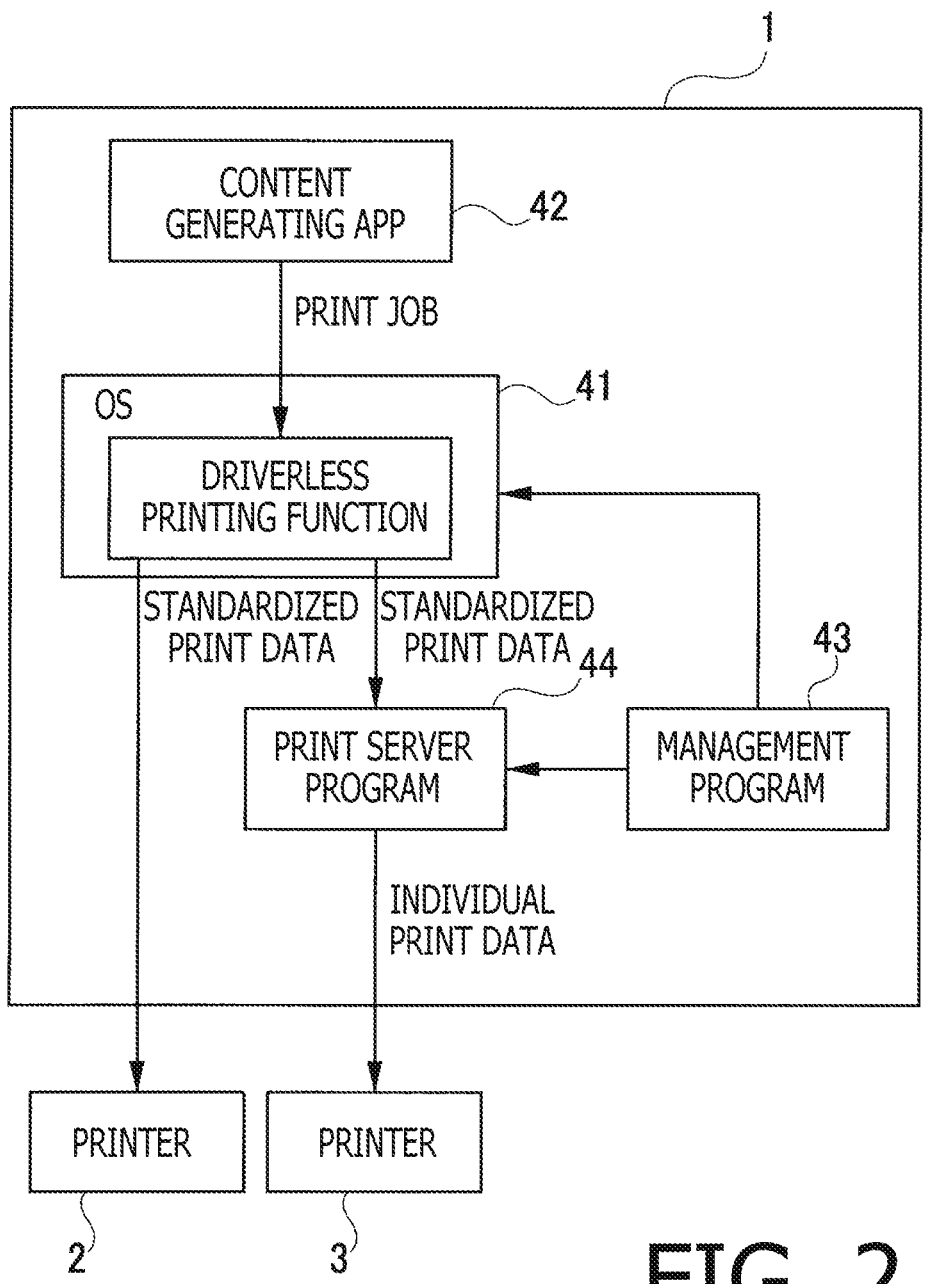
FIG. 2 illustrates printing procedures with use of a printer compliant with a driverless printing and a printer noncompliant with the driverless printing.

As shown in FIG. 2, the information processing device 1 performs different processes when causing the compliant printer 2 to perform printing and when causing the non-compliant printer 3 to perform printing. When, for example, a print command is received from the content generating APP 42 and the received print command designates the compliant printer 2, the OS 41 of the information processing device 1 transmits standardized print data, which is generated with use of the driverless printing function, to the compliant printer 2. In response to receipt of the standardized print data, the compliant printer 2 performs printing based on the standardized print data as received.

When the printer designated by the print command is the virtual printer corresponding to the non-compliant printer 3, the information processing device 1 delivers the standardized print data generated with use of the driverless printing function to the print server program 44. The print server program 44 obtains, based on the standardized print data, the individual print data which is the print data having a format processible by the non-compliant printer 3, and transmits the individual print data to the non-compliant printer 3. The individual print data is an example of a particular format print data.

Next, an operation of the information processing device 1 to cause the non-compliant printer 3 to perform printing will be described. In the following description, processes and steps of flowcharts basically indicate processes performed by the CPU 11 following instructions described in the management program 43, the print server program 44 and the like. The processes performed by the CPU 11 include control of hardware with use of an interface enabling data exchange among modules of the OS 41 of the information processing device 1 (also known as an API). In the specification, description on the operations performed in accordance with the programs will be simplified by omitting description on the OS 41.

Figure 3:
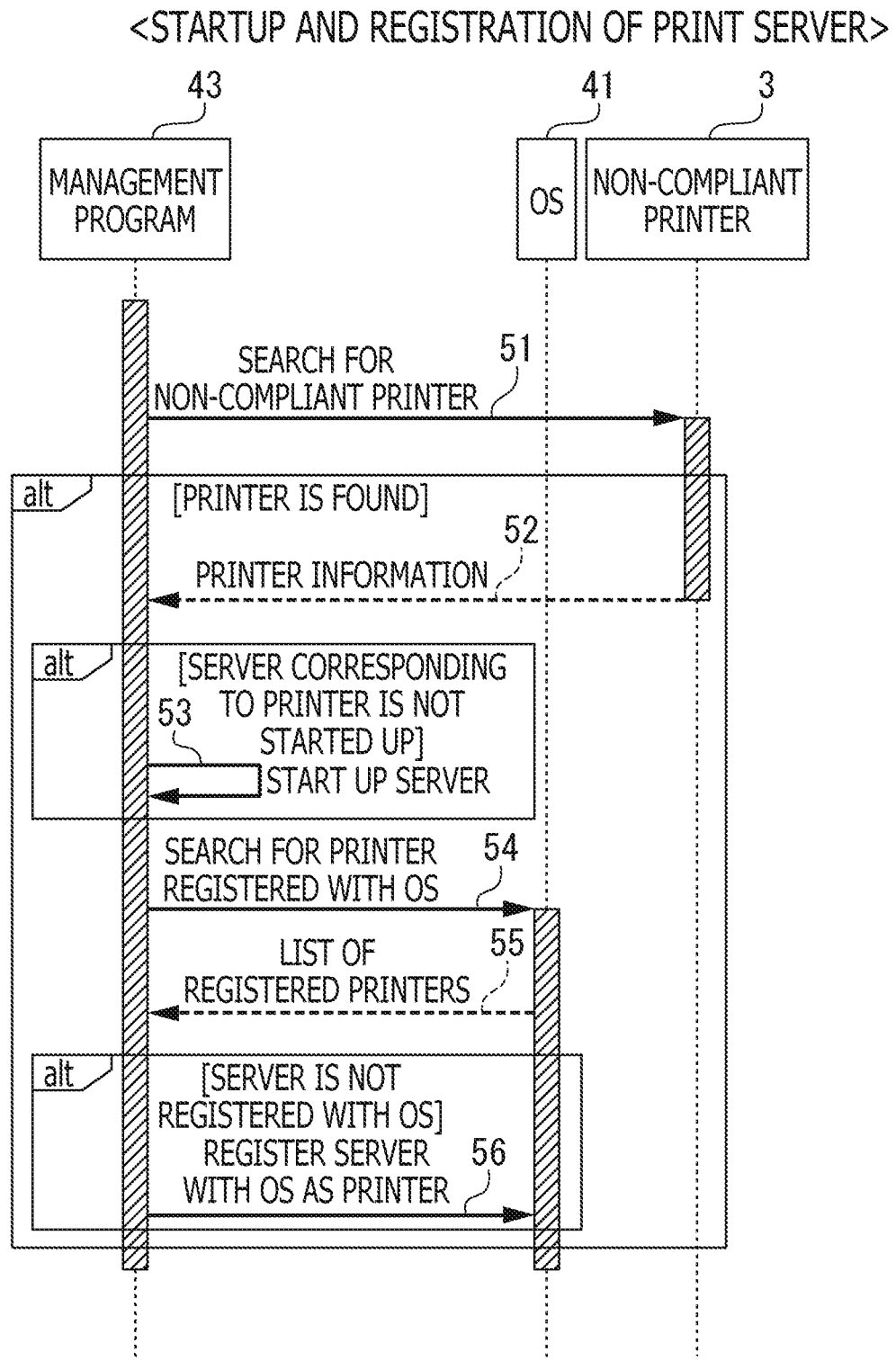
FIG. 3 is a sequential chart showing invocation and registration of a print server.
Figure 4:
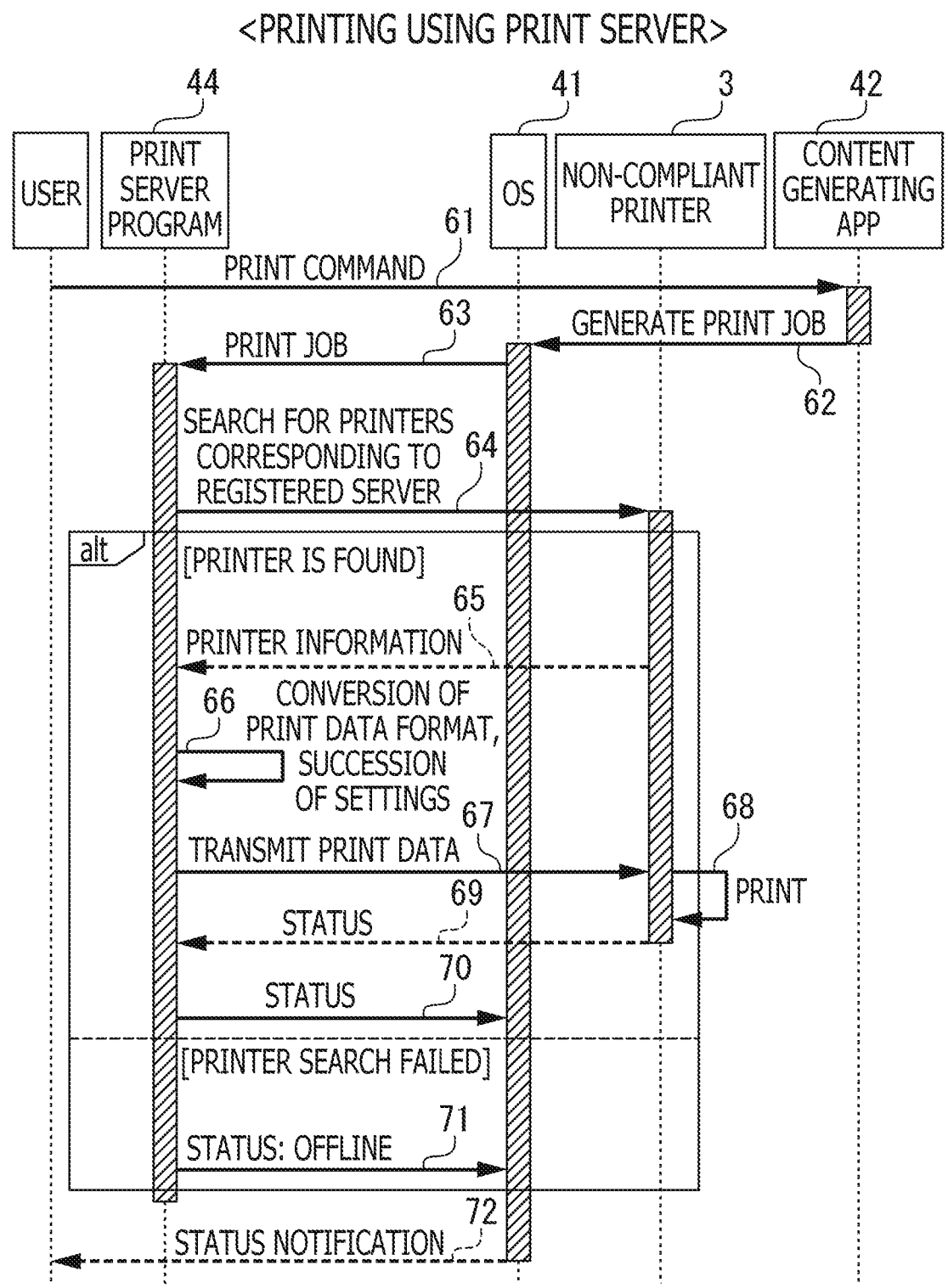
FIG. 4 is a sequential chart showing printing with use of a print server.
Figure 5:
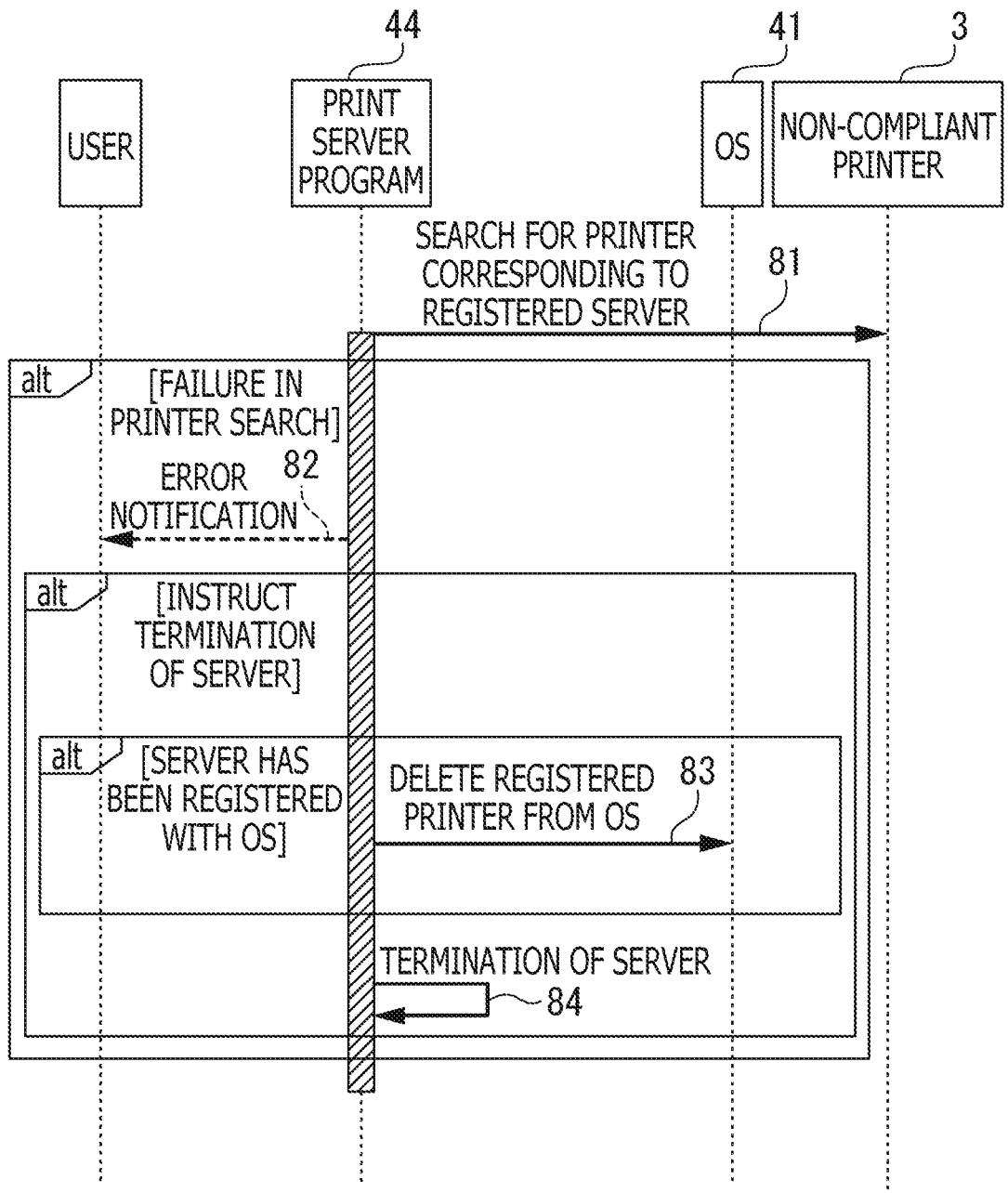
FIG. 5 is a sequential chart showing termination of the print server.

Firstly, referring to sequential charts shown in FIGS. 3-5, the operation of the information processing device 1 will be generally described. Initially, a print preparation operation according to the management program 43 will be described, referring to the sequential chart shown in FIG. 3. The management program 43 is started up when, for example, the information processing device 1 is started up. When started up, the management program 43 searches for a printer connected to the information processing device 1. When the management program 43 performs searching, different from a search according to the driverless printing function, the information processing device 1 multicasts a search signal to which the non-compliant printer 3 can reply.

Then, the management program 43 determines whether there exists a non-compliant printer 3 connected to the information processing device 1 (procedure #51 of FIG. 3). When, for example, connected printer(s) is only the compliant printer(s) 2 corresponding to the driverless print function, it is unnecessary for the information processing device 1 to execute the print server program 44.

When the non-compliant printer 3 is found, the management program 43 obtains printer information in order to cause the non-compliant printer 3 to perform printing (procedure #52). Concretely, the management program 43 obtains model information, version information and the like of the non-compliant printer 3.

When the print server program 44 corresponding to the found non-compliant printer 3 is not running, the management program 43 starts up the print server program 44 (procedure #53). It is noted that, when a plurality of non-compliant printers 3 are found, the management program 43 performs procedures #52 and #53 for each of the plurality of non-compliant printers 3 as found.

Further, the management program 43 determines whether the print server configured by the print server program 44 has been registered with the OS 41. That is, the management program 43 searched for printers registered with the OS 41 (procedure #54) and obtains a list of printers from the OS 41 (procedure #55). When the print server configured by the print server program 44 is not included in the list of printers as obtained, the management program 43 registers the print server configured by the print server program 44 with the OS 41 as a virtual printer corresponding to the found non-compliant printer 3 (procedure #56).

Next, a printing operation with use of the print server program 44 will be described referring to a sequential chart shown in FIG. 4. The information processing device 1 receives a user operation of a print command of a content through the content generating APP 42 being executed (procedure #61). The content generating APP 42 generates a print job based on the received print command, and registers the generated print job with the OS 41 (procedure #62). Then, the OS 41 processes the registered print job with use of the driverless printing function to generate a print job including the standardized print data.

The OS 41 delivers the print job which designates the virtual printer corresponding to the non-compliant printer 3 as the output destination to the print server program 44 corresponding to the non-compliant printer 3 (procedure #63). The print server program 44 searches the non-compliant printer 3 which is the output destination, and determines whether the non-compliant printer 3 is in a printable state (procedure #64).

The non-compliant printer 3, when in the printable state, transmits printer information thereof to the print server program 44 (procedure #65). Then, based on the printer information, the print server program 44 generates, from the standardized print data, individual print data having a format which is processible by the non-compliant printer 3. Further, based on the printer information, the print server program 44 succeeds print settings included in the print job and makes the print settings to have a format processible by the compliant printer 3 (procedure #66).

Then, the print server program 44 transmits the generated individual print data and the print settings to the non-compliant printer (procedure #67). The non-compliant printer 3 performs printing based on the received individual print data (procedure #68), and transmits status information (e.g., printing completed status) to the print server program 44 (procedure #69). The print server program 44 delivers the received status information to the OS 41 (procedure #70).

When the printer is searched in procedure #64 but a non-compliant printer 3 is not found, the print server program 44 delivers status information indicating that the non-compliant printer 3 is in offline state to the OS 41

(procedure #71). The OS 41 notifies the status information received in procedure #70 or #71 to the user through, for example, the content generating APP 42 (procedure #72).

Next, termination of the print server program 44 will be described, referring to a sequential chart shown in FIG. 5. The print server program 44 searches for the non-compliant printer 3 at a particular timing (procedure #81) when the print server program 44 is not performing the process of the print job. When there is no reply from the non-compliant printer 3 and searching is failed, the print server program 44 notifies that the non-compliant printer 3 is not connected to the user as an error notification (procedure #82).

When the print server program 44 receives an instruction to termination of the server through, for example, a user operation, if a print server configured by the print server program 44 has been registered, as the virtual printer, with the OS 41, the print server program 44 deletes registration of the virtual printer corresponding to the print server program 44 from the OS 41 (procedure #83). Further, the print server program 44 terminates itself (procedure #84). By terminating the print server program 44 which becomes unnecessary any more, a process load to the information processing device 1 can be reduced.

Figure 6:
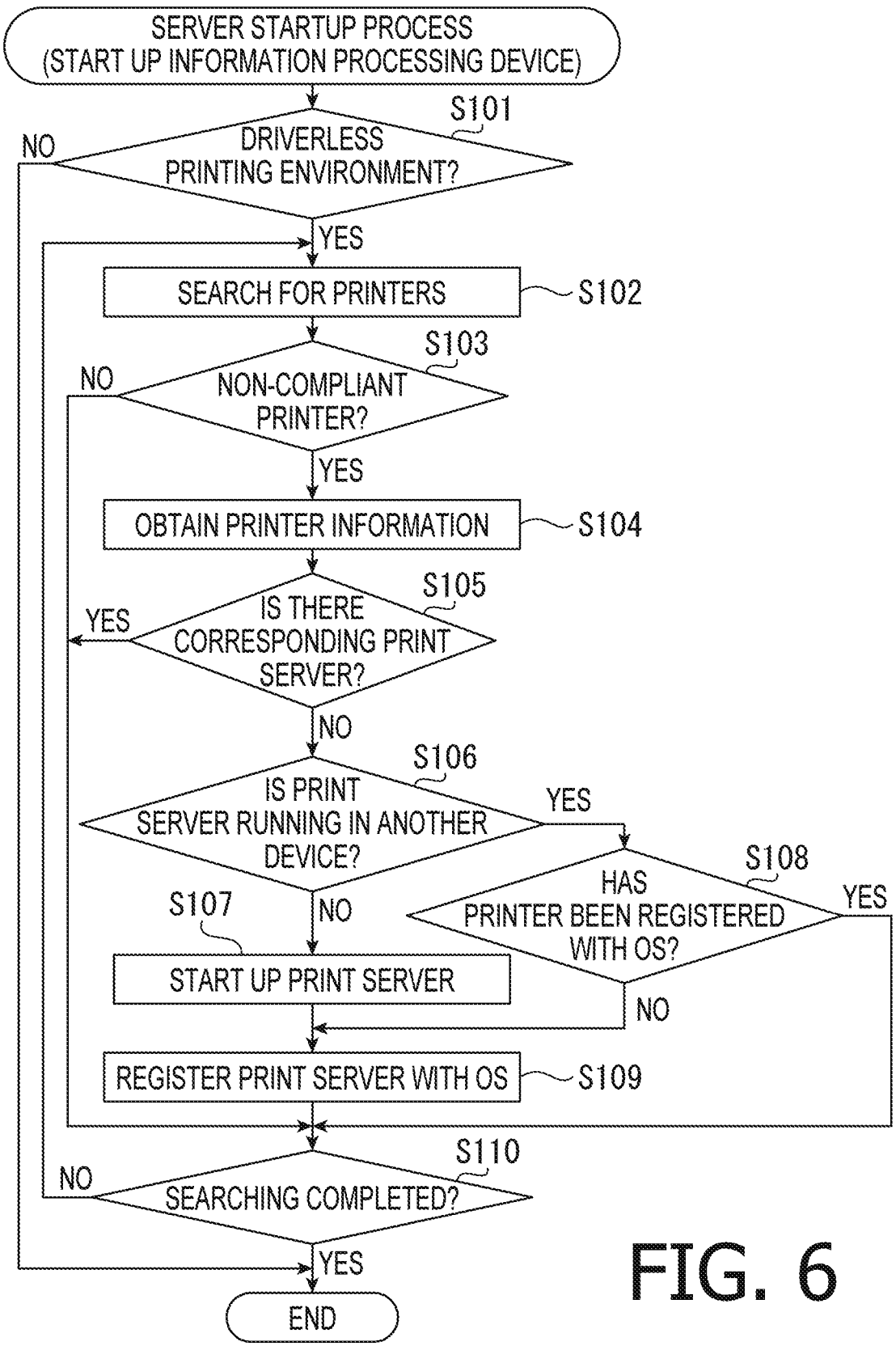
FIG. 6 is a flowchart illustrating a sever invocation process.

Next, operations of respective programs will be described referring to flowcharts shown in FIGS. 6, 8 and 9. It is noted that the procedure numbers indicated in the following description correspond to the procedure numbers indicated in the sequential charts shown in FIGS. 3-5.

Firstly, a server startup process performed by the management program 43 will be described, referring to a flowchart shown in FIG. 6. The server startup process is to be executed by the CPU 11 and is triggered by, for example, startup of the information processing device 1, a connection of a printer to the information processing device 1, receipt of a print command and the like.

In the server startup process, the CPU 11 firstly determines whether the information processing device 1 is in a driverless printing environment (S101). For example, the CPU 11 obtains version information of the OS 41 of the information processing device 1, and determines whether the OS 41 is implemented with the driverless printing function, and whether an operation environment of the OS 41 does not accept installation of a printer driver. Alternatively or optionally, the CPU 11 may determine whether a printer driver has been installed in the information processing device 1. When it is determined that the information processing device 1 is not in the driverless printing environment (S101: NO), the CPU 11 terminates the server startup process.

When the information processing device 1 is in an environment where the printer driver can be installed, by installing the printer driver, since the driverless printing function does not need to be executed, a processing load to the information processing device 1 can be reduced. Further, by checking the version of the OS 41, it is known whether version up of the OS 41 has been made. When, for example, the operation environment has been changed to the driverless printing environment by the version up of the OS 41 from the environment where the printer driver can be installed, the management program 43 and the print server program 44 can be appropriately functioned. Therefore, the information processing device 1 can provide a printing environment which is substantially the same as the previous printing environment, and the user can use the non-compliant printer 3 with the same usability as before.

When the information processing device 1 is in the driverless printing environment (S101: YES), the CPU 11 searches for the printers connected to the information processing device 1 sequentially (S102). Then, the CPU 11 determines whether the found printer is the non-compliant printer 3 (S103, procedure #51). Step S103 is an example of a first connection determining process.

For example, the CPU 11 inquires each of the printers connected to the information processing device 1 through the network I/F 16 and determines whether each of the printers has a capability of complying with the driverless printing function. When, for example, the information processing device 1 has a list of external devices connected to the information processing device 1, the CPU 11 may perform connection check of the non-compliant printer(s) 3 in the list in S103.

When it is determined that the non-compliant printer 3 is found (S103: YES), the CPU 11 obtains the printer information therefrom (S104, procedure #52). The CPU 11 obtains, for example, printer model information, version information, data formats of the print data supported by the printer and the like as printer information. The CPU 11 may obtain the printer information by inquiring the printer 3 or obtain from a list of external devices.

Further, the CPU 11 determines whether the print server program 44 corresponding to the found non-compliant printer 3 is running (S105). Step S105 is an example of a running determination process. When the CPU 11 determines that the print server program 44 is not running (S105: NO), the CPU 11 determines whether the print server program 44 corresponding to the non-compliant printer 3 is running in another device which is communicatable with the information processing device 1 (S106). It is noted that step S106 is also an example of the running determination process.

Figure 7:
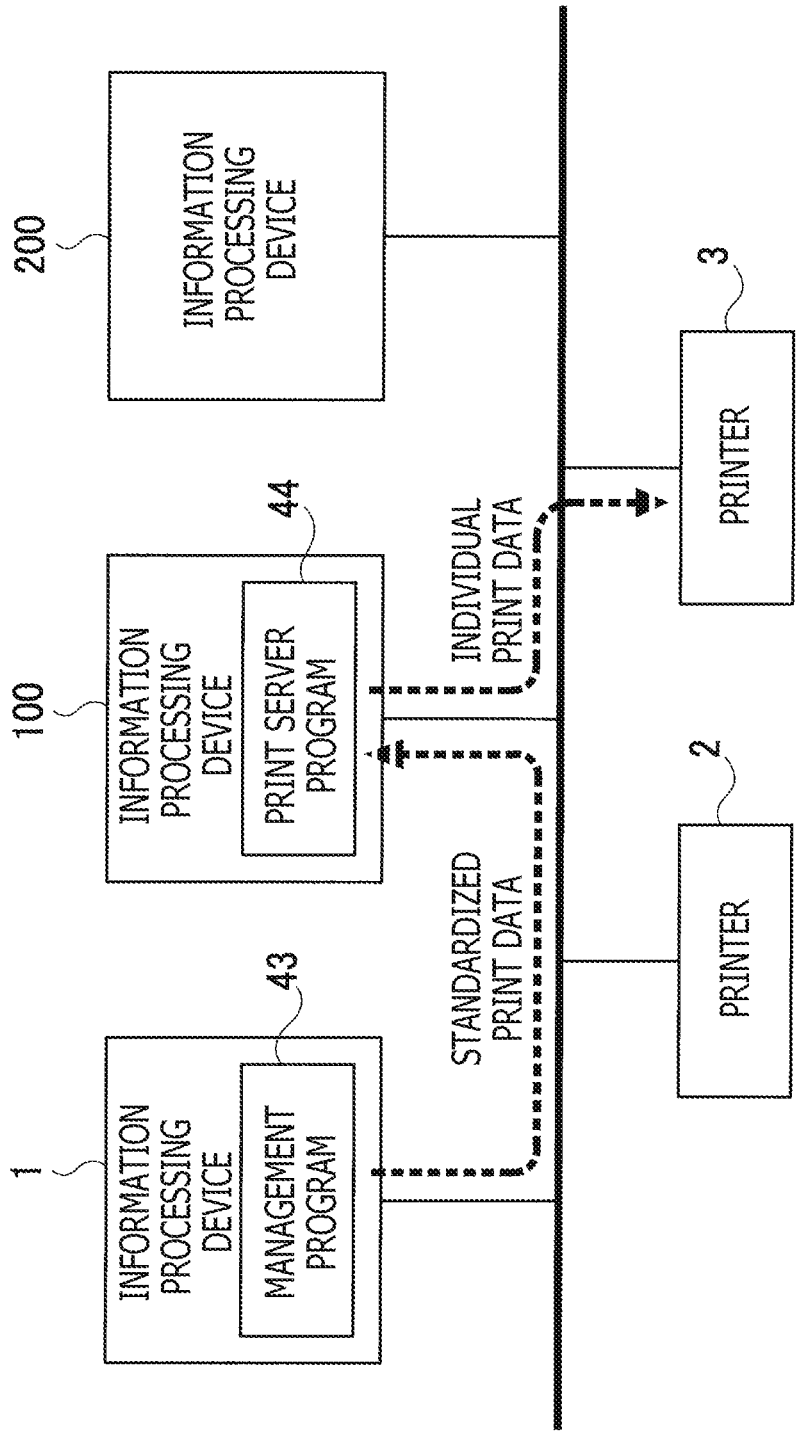
FIG. 7 illustrates usage of a print server program of another information processing device.

FIG. 7 shows an information processing system in which a plurality of information processing devices are connected so as to be mutually communicatable. In the example shown in FIG. 7, three information processing devices (i.e., the information processing devices 1, a second information processing device 100 and a third information processing device 200 are provided. The three information processing devices 1, 100 and 300 can use the same non-compliant printer 3. When the print server program 44 is running in the second information processing device 100, the information processing device 1 can make use of the print server program 44 running in the second information processing device 100. In such a case, by registering the print server configured by the print server program 44 of the second information processing device 100 with the OS 41 as the virtual printer, the information processing device 1 can use the print server program 44 of the second information processing device 100. In this case, the print server configured by the print server program 44 running on the second information processing device 100 is an example of an existing print server.

As shown in FIG. 7, the information processing device 1 can deliver the standardized print data to the second information processing device 100, cause the print server program 44 running on the second information processing device 100 to generate the individual print data, and cause another information processing device 100 to transmit the individual print data to the non-compliant printer 3. According to such a configuration, the information processing device 1 does not need to start up the print server program 44 therein, and a process load to the information processing device 1 can be reduced.

When it is determined that the print server program 44 is not running on none of the plurality of the information processing devices 1, 100 and 200 (S106: NO), the CPU 11 starts up the print server program 44 corresponding to the found non-compliant printer 3 (S107, procedure #53). Step S107 is an example of a startup process.

When it is determined that the print server program 44 corresponding to the found non-compliant printer 3 is running on another device (S106: YES), the CPU 11 determines whether the print server configured by the print server program 44 has been registered with the OS (S108). For example, the CPU 11 inquires the OS 41 to obtain a list of printers registered with the OS 41 (procedures #54 and #55), and determines whether the print server registered as the virtual printer corresponding to the non-compliant printer 3 is included in the list.

After execution of S107, or when it is determined that the print server corresponding to the non-compliant printer 3 is not registered with the OS 41 (S108: NO), the CPU 11 registers the print server configured by the print server program 44 with the OS 41 as the virtual printer (S109, procedure #56). Step S109 executed after execution of S107 is an example of a print server registration process. Further, step S109 executed after it is determined that the print server corresponding to the non-compliant printer 3 is not registered with the OS 41 (S108: NO) is an example of an existing print server registration process.

In S109, the CPU 11 registers the print server configured by the print server program 44 with use of a model name or a nickname of the detected non-compliant printer 3. Optionally, a user designation of the name may be accepted. By registering the print server configured by the print server program 44 with the OS 41 as the non-compliant printer 3, the non-compliant printer 3 is one of selectable printers when a print command is made though the content generating APP 42 and the like.

When it is determined that the found printer is not the non-compliant printer 3 (S103: NO), when it is determined that the print server program 44 is running (S105: YES), when it is determined that the print server configured by the print server program running on another device is registered with the OS 41 (S108: YES) or after execution of S109, the CPU 11 determines whether searching for printers has been completed (S110). When it is determined that searching has not been completed (S110: NO), the CPU 11 returns to S102 and further searches for printers. When it is determined that searching has been completed (S110: YES), the CPU 11 terminates the server startup process.

Figure 8:
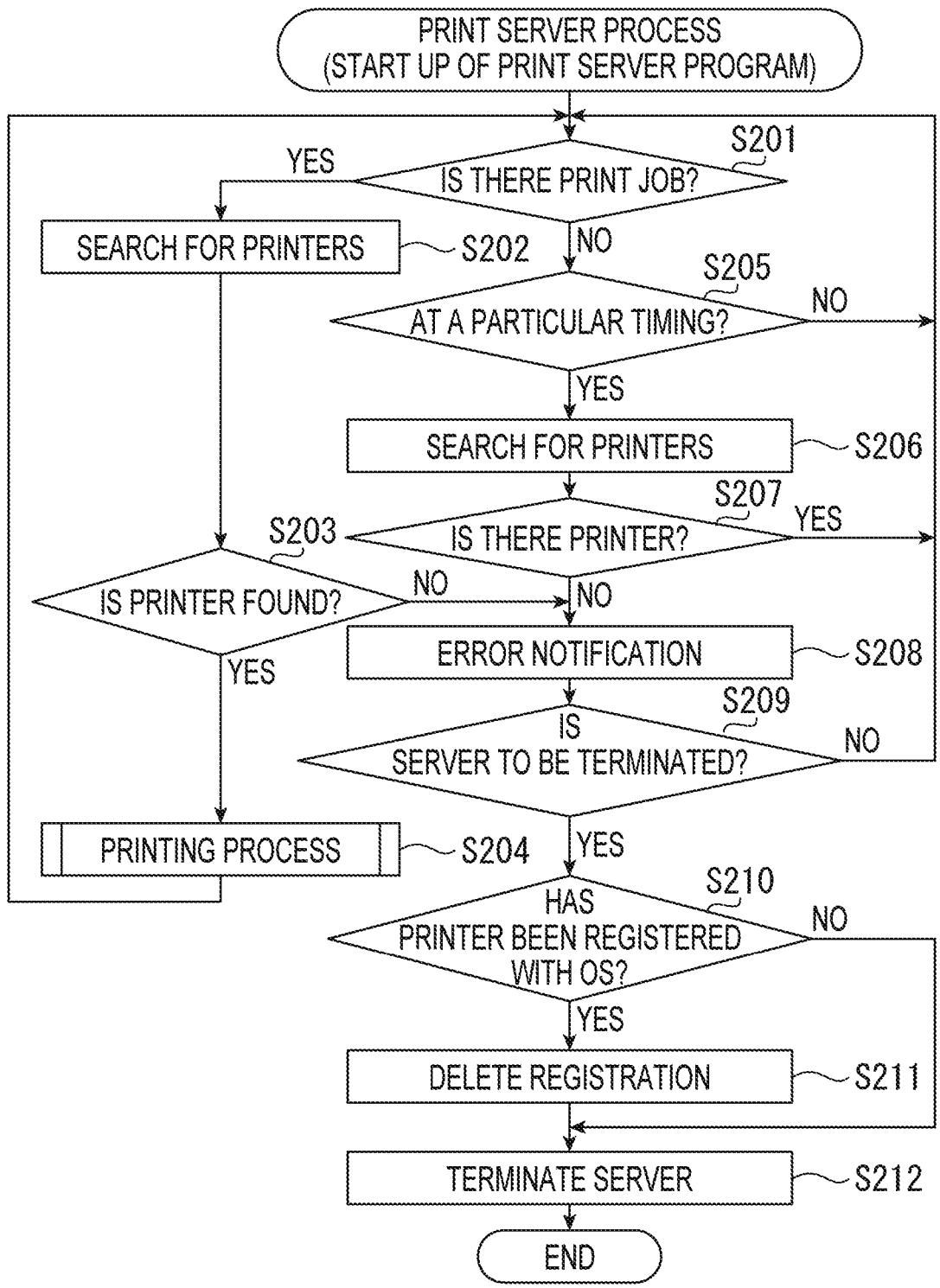
FIG. 8 is a flowchart illustrating a print server process.
Figure 9:
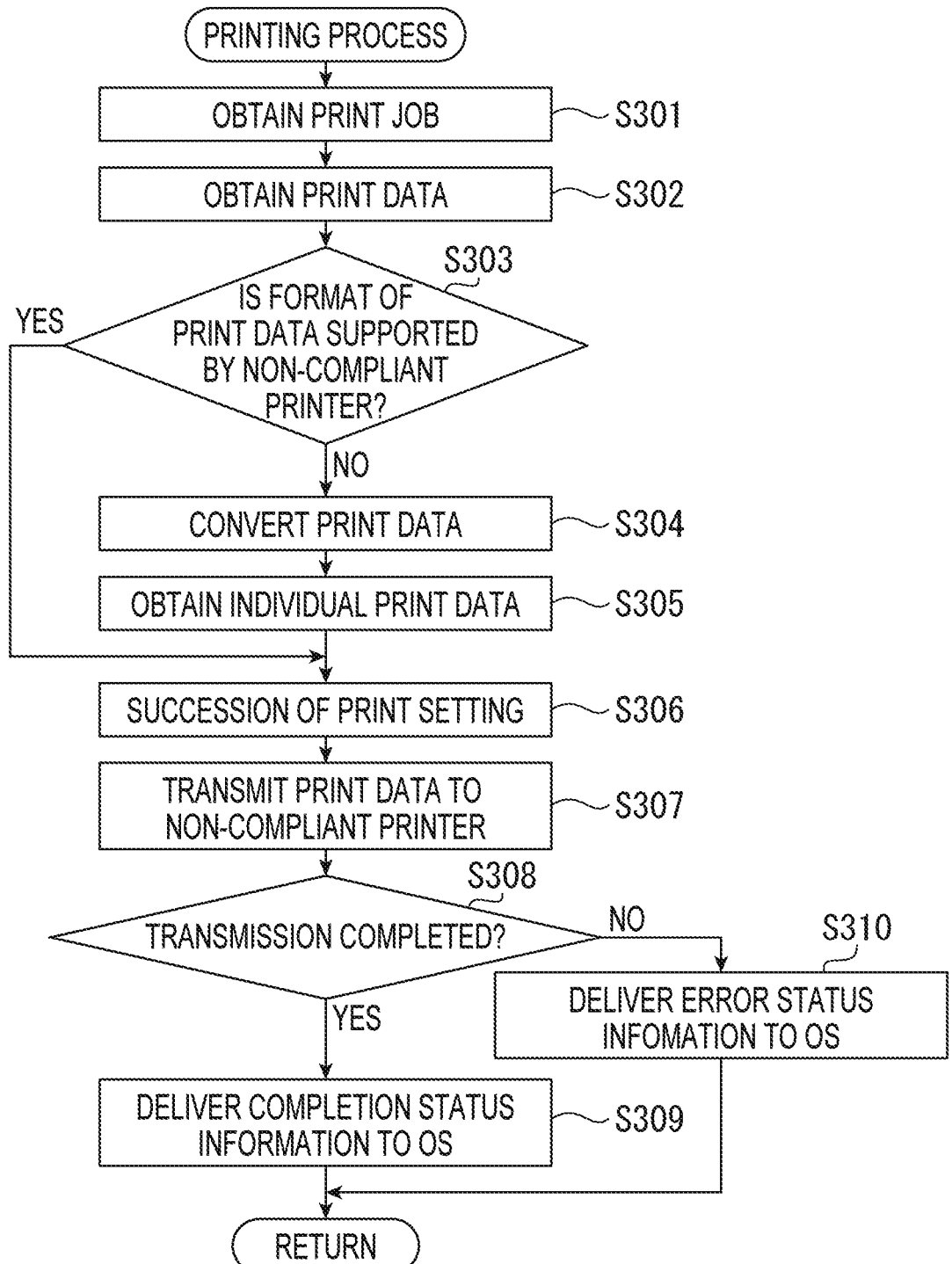
FIG. 9 is a flowchart illustrating a printing process.

Next, a print server procedure in accordance with the print server program 44 will be descried, referring to a flowchart shown in FIG. 8. The print server process is performed by the CPU 11 in response to the print server program 44 being started up in S107 of the server startup process.

In the print server process, the CPU 11 determines whether there exists a print job designating the virtual printer corresponding to the non-compliant printer 3 as the output destination (S201). The print job is created in response to, for example, receipt of the print command by the content generating APP 42 and is registered with the OS 41 (procedure #62 of FIG. 4). The CPU 11 periodically transmits inquiry to the OS 41 (S201). Alternatively, the CPU 11 monitors a printer spooler of the OS 41 to determine whether there exists a corresponding print job. Further alternatively, the CPU 11 may receive a print job designating the virtual printer corresponding to the non-compliant printer 3 as the output destination from another information processing device connected to the information processing device 1.

When it is determined that the there exists a print job (S201: YES), the CPU 11 searches for the non-compliant printer 3 corresponding to the print server program 44 (S202, procedure #64), and determines whether the non-compliant printer 3 has been found (S203). When it is determined that the non-compliant printer 3 is found (S203: YES), the CPU 11 performs the printing process (S204). The printing process is a process causing, by the print server program 44, the non-compliant printer 3 to perform printing.

The printing process will be described referring to a flowchart shown in FIG. 9. In the printing process, the CPU 11 firstly obtains a print job (S301). Step S301 is an example of a receiving process. Further, the CPU 11 obtains print data included in the obtained print job (S302). The print data included in the print job is data generated by the driverless printing function, which is, for example, the standardized print data. The print data included in the print job is an example of original print data.

Then, the CPU 11 determines whether the print data included in the print job is data of a format which is supported by the non-compliant printer 3 (S303). Step S303 is an example of a format determining process. The format supported by the non-compliant printer 3 is not limited only to the individual print data. Further, the print data generated by the driverless printing function is not necessarily be limited to the standardized print data. That is, there is a possibility that the non-compliant printer 3 can print out the print data even if it is generated by the driverless printing function.

When it is determined that the print data included in the print job is of the format which is not supported by the non-compliant printer 3 (S303: NO), the CPU 11 converts the print data into the individual print data which is print data supported by the non-compliant printer 3 (S304, procedure #66).

It is note that conversion of the print data may be performed by the print server program 44 or another program such as the management program 43. For example, the CPU 11 may deliver the print data included in the print job and information regarding the print data format which can be processed by the non-compliant printer 3 to the management program 43, and request the management program 43 to perform the conversion of the print data. Step S304 is an example of a conversion process.

When the management program 43 is configured to convert the print data, the print server program 44 does not need to perform the conversion process, and thereby the size of an individual print server program 44 can be downsized. In particular, even if a plurality of print server programs 44 are running, the conversion can be done by a single program (i.e., the management program 43), the size of the program running in the information processing device 1 can be downsized. On the other hand, if the conversion of the print data is performed by the respective individual print server programs 44, data exchange between the individual print server programs 44 and the management program 43 can be omitted, thereby speed-up of the conversion of the print data being achieved.

The CPU 11 obtains the converted individual print data (S305). Step S305 is an example of a print data obtaining process. When it is determined that the print data included in the print job is the data supported by the non-compliant printer 3 (S303: YES), or after execution of S305, the CPU 11 succeeds the print settings (S306, procedure #66). When decision in S303 is "YES", step S302 is an example of the print data obtaining process.

The print settings include, for example, a setting of the number of copies of print-outs, a setting of a both-side printing, and the like. It is noted that the non-compliant printer 3 is not necessarily be able to process commands of the print settings added by the driverless printing function. The CPU 11 generates a print job, in which the print settings is processible by the non-compliant printer 3, by converting the commands of the print settings according to the driverless printing function to command of the print settings according to the non-compliant printer 3.

The CPU 11 controls the network I/F 16 or the USB I/F 17 to transmit the print job including the print settings succeeded in S306 and the print data obtained in S302 or S305 to the non-compliant printer 3 (S307). Step S307 is an example of a transmitting process. Further, the CPU 11 determines whether transmission has been completed (S308).

When it is determined that transmission has been completed (S308: YES), the CPU 11 delivers the status information indicating completion of transmission to the OS 41 (S309). When it is determined that transmission has not been completed due to an error during transmission (S308: NO), the CPU 11 delivers the status information indicating occurrence of an error (S310). After execution of S309 or S310, the CPU 11 terminates the printing process and returns to the print server process. It is noted that, when the print job is one received from another device, the status information may be transmitted to the transmission source in S309 or in S310.

In FIG. 8, after execution of S204, the CPU 11 returns to S201 and determines whether there exists a print job. When it is determined that there is no print job (S201: NO), the CPU 11 determines whether the present timing is a particular timing (S205). The CPU 11 determines that the present timing is the particular timing when, for example, the print server program 44 is running and a particular time period has elapsed since a startup thereof or previous printing process. It is noted that the particular timing may be only once, or the CPU 11 may periodically determine the particular timing.

When it is determined that the present timing is the particular timing (S205: YES), the CPU 11 searches for the non-compliant printer 3 corresponding to the print server program 44 (S206, procedure #81). Step S206 is the same process as S202. Then, the CPU 11 determines whether the non-compliant printer 3 has been found (S207). Step S207 is an example of a second connection determining process.

When it is determined that the non-compliant printer 3 has not been found in the search performed in S202 or S206 (S203: NO, or S207: NO), the CPU 11 notifies an error (S208). That is, the CPU 11 controls, for example, the user I/F 15 to display error information indicating that the non-compliant printer 3 is offline. When the non-compliant printer 3 is offline, it is impossible to cause the non-compliant printer to perform printing. By not performing the printing process when decision in S203 or S207 is "NO", the process load to the CPU 11 can be reduced.

Next, the CPU 11 determines whether the print server program 44 is to be terminated (S209). The CPU 11 controls, for example, the user I/F 15 to display a screen inquiring the user whether the print server program 44 is to be terminated, and receives the instruction by the user. Alternatively, the CPU 11 may determine that the print server program 44 is to be terminated when a particular condition (e.g., an offline state of the non-compliant printer 3 continuing for a particular period or more) is satisfied.

When it is determined that the present timing is not the particular timing (S205: NO), when the non-compliant printer 3 is found (S207: YES), or when it is determined that the print server program 44 is not to be terminated (S209: NO), the CPU 11 returns to S201 and determines whether there exists a print job.

When it is determined that the print server program 44 is to be terminated (S209: YES), the CPU 11 determines whether the print server configured by the print server program 44 is registered with the OS 41 (S210). When it is determined that the print server is registered with the OS 41 (S210: YES), the CPU 11 deletes the registration (S211).

As registration of the print server configured by the print server program 44 is deleted, it becomes impossible to select the virtual printer corresponding to the non-compliant printer 3 from a normal APP, it is suppressed that the user inadvertently inputs a print command. It is noted that, when the print server configured by the print server program 44 of the information processing device 1 has been registered in another device, a notification to delete the registration may be transmitted to another device.

After execution of S211, or when it is determined that the printer has not been registered with the OS 41 (S210: NO), the CPU 11 terminates the print server program 44 (S212) and terminates the print server process. Step S212 is an example of a termination process. It is noted that, when the print server program 44 is terminated, the termination may be notified to the user. When the non-compliant printer 3 is offline, it is impossible to make the non-compliant printer 3 perform printing. Therefore, by terminating the print server program 44, the process load to the information processing device 1 can be reduced.

As describe in detail above, according to the illustrative embodiment, when the non-compliant printer 3 which is not compliant with the driverless printing function is connected to the information processing device 1, the management program 43 starts up the print server program 44 corresponding to the non-compliant printer 3. Then, the print server program 44 receives the print job through the OS 41, obtains the individual print data processible by the non-compliant printer 3 based on the standardized print data of the received print job, and transmits the individual print data to the non-compliant printer 3. Accordingly, even if the information processing device 1 is in the environment where the printer driver for the non-compliant printer 3 is not installed, it is possible to make the non-compliant printer 3 perform printing.

It is noted that the configuration of the above-described embodiment is only an example and is not directed to limit the aspects of the present disclosures. Therefore, the technique in the present disclosures can be modified and/or improved in various ways without departing from the aspects of the present disclosures. For example, the number of the information processing devices or the printers configured the illustrative embodiment are not limited to those shown in FIG. 1 or FIG. 7. For example, the compliant printer 2 may not be connected to the information processing device 1.

For example, the print server program 44 running on another device may not be used. For example, S106 of the server startup process may be deleted, and control may proceed to S107 when determination of S105 is "NO". It should be noted, however, by making use the print server program 44 of another device, the process load to the information processing device 1 can be reduced.

For example, determination whether the print data of the print job generated by the driverless printing function is supported by the non-compliant printer 3 may not be made. That is, S303 of the printing process may be deleted, and conversion of the print data may be performed every time.

It should be noted, however, there may exit print data supported by the non-compliant printer 3, the process load to the information processing device 1 is reduced by executing S303.

For example, searching for printers may be performed when the print data is transmitted. That is, even if the non-compliant printer 3 is offline, conversion of the print data may be completed. For example, instead of S202 and S203 of the print server process, searching of the non-compliant printer 3 may be performed before S307 of the printing process.

Further, even if the non-compliant printer 3 is offline, the print server program 44 may not be terminated. Further, a notification to the user when the print server program 44 is terminated may be omitted.

It is noted that the processes disclosed above may be performed by a single CPU, a plurality of CPU's, hardware such as an ASIC, or combination thereof. Further, the processes as disclosed may be realized in various ways such as a method, a non-transitory recording medium storing instructions causing a computer to perform such a method, and the like.

What is claimed is:

1. A non-transitory computer-readable recording medium containing computer-executable instructions to be executed by a controller of an information processing device, the instructions including first instructions constituting a management program and second instructions constituting a print server program,
    wherein the first instructions cause, when executed by the controller, the information processing device to perform:
        a first connection determining process of determining whether a particular printer is connected through a communication interface of the information processing device;
        when it is determined in the first connection determining process that the particular printer is connected, a running determination process of determining whether the print server program constituted by the second instructions corresponding to the particular printer is running;
        when it is determined in the running determination process that the print server program constituted by the second instructions is not running, a startup process of starting up the print server program constituted by the second instructions; and
        when the print server program constituted by the second instructions is started up in the startup process, a print server registration process of registering a print server, which is configured by the started up print server program, with an operating system of the information processing device as a virtual printer, and
    wherein the second instructions cause, when executed by the controller, the information processing device to perform:
        a receiving process of receiving, through the operating system, a print job designating the virtual printer as an output destination;
        when the print job designating the virtual printer as the output destination is received in the receiving process, a print data obtaining process of obtaining print data having a particular format printable by the particular printer based on the print job; and
        a transmitting process of transmitting the print data obtained in the print data obtaining process to the particular printer.

2. The non-transitory computer-readable recording medium according to claim 1,
    wherein, in the print data obtaining process, the print server program constituted by the second instructions delivers original print data, which has a format different from the particular format and includes in the print job, to the management program constituted by the first instructions, and requests the management program constituted by the first instructions to convert the original print data to the print data having the particular format,
    wherein the first instructions cause, when executed by the controller, the information processing device to perform a conversion process of converting the original print data delivered in the print data obtaining process to the print data having the particular format, and
    wherein, in the print data obtaining process, the print server program constituted by the second instructions obtains the print data converted in the conversion process by the management program after the print server program requests for conversion of the print data to the print data having the particular format.

3. The non-transitory computer-readable recording medium according to claim 1,
    wherein, in the print data obtaining process, the print server program constituted by the second instructions converts original print data included in the print job and having a format different from the particular format to print data having the particular format.

4. The non-transitory computer-readable recording medium according to claim 1,
    wherein the second instructions cause, when executed by the controller, the information processing device to perform a format determining process of determining whether original print data included in the print job received in the receiving process is print data having a format printable by the particular printer, and
    wherein, when it is determined in the format determining process that the original print data has the format printable by the particular printer, the print server program constituted by the second instructions obtains the original print data as the print data having the particular format in the print data obtaining process.

5. The non-transitory computer-readable recording medium according to claim 1,
    wherein, in the running determination process, it is determined that the print server program is running even when the print server program is running in an other information processing device connected to the information processing device, and
    wherein, even if it is determined in the running determination process that the print server program is running, when an existing print server constituted by the print server program of the other information processing device is not registered with the operating system, the first instructions cause the information processing device to perform existing print server registration process of registering the existing print server with the operating system as a printer.

6. The non-transitory computer-readable recording medium according to claim 1,
    the second instructions cause the information processing device to perform:

a second connection determining process of determining, at a particular timing when the print server program is being executed, whether the particular printer is connected through the communication interface; and when it is determined, in the second connection determining process, that the particular printer is not connected, a termination process of terminating the print server program.

7. The non-transitory computer-readable recording medium according to claim 6,
wherein, in the termination process, the second instructions cause the information processing device to delete registration of the print server from the operation system.

8. The non-transitory computer-readable recording medium according to claim 1,
in the print data obtaining process, the second instructions cause the information processing device to perform:
when the print job is received in the receiving process, determining whether the particular printer is connected through the communication interface; and
when it is determined that the particular printer is connected, obtaining the print data having the particular format.

9. The non-transitory computer-readable recording medium according to claim 1,
wherein, even if it is determined, in the first connection determining process, that the particular printer is connected, when a printer driver program corresponding to the particular printer is stored in a memory of the information processing device, the first instructions cause the information processing device not to perform the running determination process or the startup process.

10. The non-transitory computer-readable recording medium according to claim 1,
wherein, even if it is determined in the first connection determining process, that the particular printer is not connected, when a version of the operating system is a particular version, the first instructions cause the information processing device not to perform the running determination process or the startup process.

11. A method of controlling an information processing device, the method comprising:
determining whether a particular printer is connected through a communication interface of the information processing device;
when it is determined that the particular printer is connected, determining whether a print server program corresponding to the particular printer is running;
when it is determined that the print server program is not running, starting up the print server program;
when the print server program is started up, registering a print server, which is configured by the started up print server program, with an operating system of the information processing device as a virtual printer;
receiving, through the operating system, a print job designating the virtual printer as an output destination;
when the print job designating the virtual printer as the output destination is received, obtaining print data having a particular format printable by the particular printer based on the print job; and
transmitting the obtained print data to the particular printer.

* * * * *